United States Patent
Heidemann et al.

(10) Patent No.: US 10,414,048 B2
(45) Date of Patent: Sep. 17, 2019

(54) NONCONTACT SAFETY SENSOR AND METHOD OF OPERATION

(71) Applicant: FARO Technologies, Inc., Lake Mary, FL (US)

(72) Inventors: Rolf Heidemann, Stuttgart (DE); Bernd-Dietmar Becker, Ludwigsburg (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 204 days.

(21) Appl. No.: 15/692,610

(22) Filed: Aug. 31, 2017

(65) Prior Publication Data
US 2018/0071914 A1 Mar. 15, 2018

Related U.S. Application Data (60) Provisional application No. 62/426,802, filed on Nov. 28, 2016, provisional application No. 62/394,495, filed on Sep. 14, 2016.

(51) Int. Cl.
  *G01B 11/02* (2006.01)
  *B25J 9/16* (2006.01)
  (Continued)

(52) U.S. Cl.
  CPC ............ *B25J 9/1676* (2013.01); *B25J 9/1697* (2013.01); *B25J 19/06* (2013.01); *F16P 3/142* (2013.01);
  (Continued)

(58) Field of Classification Search
  CPC ...... G02B 2027/0138; G02B 2027/014; G02B 27/0093; G02B 2027/0185;
  (Continued)

(56) References Cited

U.S. PATENT DOCUMENTS 7,167,575 B1 * 1/2007 Nichani .......... G08B 13/19604
                                                348/143
7,319,109 B2    1/2008 Boggs et al.
(Continued)

FOREIGN PATENT DOCUMENTS

DE        10026711 A1    12/2001
WO      2016041695 A1     3/2016

OTHER PUBLICATIONS

Holoeye Photonics AG » Spatial Light Modulators; Retrieved from https://holoeye.com/spatial-light-modulators/ (4 pgs).
(Continued)

*Primary Examiner* — Michael P Stafira
(74) *Attorney, Agent, or Firm* — Cantor Colburn LLP (57) ABSTRACT

A safety sensor system and method is provided. The method includes projecting from a projector a pattern of light to a first position. The pattern of light being generated by a shape control element with each of the first pattern of light having a pattern pose. A first image is captured with a camera of the first pattern of light. The pose or shape of the pattern of light is changed using the shape control element. A pattern pose or shape information is determined from both images. It is determined that the second image is valid based on the pattern pose or shape information differing by more than predetermined measurement errors or the pattern pose or shape information differing less than predetermined measurement errors from values that are based on the control values transmitted to the pattern pose and shape control element.

28 Claims, 9 Drawing Sheets

(51) Int. Cl.
*B25J 19/06* (2006.01)
*F16P 3/14* (2006.01)
*G01B 11/00* (2006.01)
*G01B 11/25* (2006.01)

(52) U.S. Cl.
CPC ........ *G01B 11/002* (2013.01); *G01B 11/2513* (2013.01); *G05B 2219/40196* (2013.01); *G05B 2219/40202* (2013.01)

(58) Field of Classification Search
CPC ............ G02B 21/0032; G02B 27/0172; G02B 27/0179; G02B 2027/0134; G02B 27/017; G02B 26/023; G02B 13/0085; G02B 2027/0187; G02B 21/0012; G02B 21/16; G02B 21/22; G02B 26/103; G02B 6/262; G02B 27/2292; G02B 13/16; G02B 2027/0178; G02B 27/0075; G02B 2027/0123; G02B 3/0056; G01B 11/25; G01B 11/24; G01B 11/2513; G01B 11/00; G01B 11/002; G01B 11/02; G01B 11/162; G01B 11/22; G01B 11/2536; G01B 9/02095; G01B 11/2504; G01B 11/2545; G01B 11/245; G01B 11/2518; G01B 21/042; G01B 11/022; G01B 11/14; G01B 21/20; G01B 2210/52; G01B 5/0007; G01B 5/004; G01B 7/004; G01B 7/16; G01N 15/06; G01N 2015/0693; G01N 21/53; G01N 33/0098; G01J 2005/0077; G01J 2005/0085; G01J 5/0265; G01J 5/12; G01J 1/32; G01J 1/42; G01J 1/4204
See application file for complete search history.

(56) References Cited

U.S. PATENT DOCUMENTS

| | | | |
|---|---|---|---|
| 7,636,117 | B2 | 12/2009 | Schnaithmann |
| 7,729,511 | B2 | 6/2010 | Wohler et al. |
| 8,988,527 | B2 | 3/2015 | Haussmann et al. |
| 2004/0008259 | A1* | 1/2004 | Gokturk ............. G01B 11/2509 348/207.1 |
| 2005/0036045 | A1 | 2/2005 | Fuchs et al. |
| 2007/0097231 | A1 | 5/2007 | Schnaithmann |
| 2015/0049063 | A1* | 2/2015 | Smith ................... G06F 3/0421 345/175 |
| 2015/0217455 | A1 | 8/2015 | Kikkeri et al. |
| 2016/0129594 | A1* | 5/2016 | Telling .................. B25J 9/1676 700/255 |
| 2017/0180654 | A1* | 6/2017 | Swaminathan ...... H04N 13/254 |
| 2019/0063907 | A1* | 2/2019 | Grau ................. G01B 11/2545 |

OTHER PUBLICATIONS

Micro Beam Steering Applications—New Scale Technologies—Retrieved from https://www.newscaletech.com/applications/micro-beam-steering-applications/ (4 pgs).

Zinn, et al., "A New Actuation Approach for Human-centric Robot Design" (Int. J of Robotics Research, vol. 23, No. 4-5, Apr.-May 2004, pp. 379-398).

Haddadin, et al. "Safety Evaluation of Physical Human-Robot Interaction via Crash Testing" by (Pro. of Robotics: Science and Systems III, Jun. 2007) 8 pgs.

Great Britain Search Report for Application No. GB1719437.4 dated May 21, 2018; 3 pgs.

* cited by examiner

NONCONTACT SAFETY SENSOR AND METHOD OF OPERATION

CROSS-REFERENCE TO RELATED APPLICATIONS

The present application is a Nonprovisional Application of U.S. Provisional Application Ser. No. 62/394,495 filed Sep. 14, 2016 and U.S. Provisional Application Ser. No. 62/426,802 filed on Nov. 28, 2016, the contents of both of which are incorporated by reference herein.

BACKGROUND

The subject matter disclosed herein relates to a safety sensor such as that used with a human friendly or human-centric robot in an environment such as a manufacturing environment, and in particular to a sensor having a self-checking system for confirming operation of the system.

Robotic devices have been widely used in manufacturing and other environments to reduce costs and improve quality. Robotic devices are hard/rigid bodies that may move in a rapid and unpredictable manner. To avoid unintended impact with human operators, a typical manufacturing cell includes a lock-out procedure whereby the robot device is disabled when human operators need to enter the area. By locking out the robotic device it is ensured that the risk of contact by a moving robot is eliminated.

One type of robotic device has been developed, referred to as a human-centric robot, which allows the robot and the human operator to work in close proximity to each other while minimizing the risk of impact to the human operator. These human-centric robots have been proposed and used in a variety of applications, including medical facilities, libraries and manufacturing assembly operations. Human-centric robots include sensors that allow them to monitor their surrounding area including the presence of humans. The robot's controller is programmed to receive these sensor inputs and predict the risk of impact with nearby humans. When a potential impact on a human is detected, the robot takes mitigating actions (e.g. slowing down or changing direction) to avoid contact. In manufacturing environments, these human-centric robots have found use in light assembly and small part manufacturing.

Standards, such as ISO/TS 15066 (2016) and IS 13849-1:2015 for example, have been propagated to define desired performance levels and architecture of sensing systems used with human-centric robots. These standards define operations of the systems to reduce contact risk between an operators and the robotic system. Sensing systems fall under a performance level "d" and category 3 of these standards. At this level of performance, the sensing system needs to have reliability for one type of failure as occurring once every 100-1000 years.

Accordingly, while existing sensing systems for use with robotic devices are suitable for their intended purpose the need for improvement remains, particularly in providing a sensing system for use with human-centric robot that is capable of operating in close proximity to a human operator.

BRIEF DESCRIPTION

According to one aspect of the invention, a system is provided. The system includes an enclosure and a projector disposed within the enclosure and having an optical axis and projector pose in a frame of reference. A means for changing a pattern of light from a first pattern of light to a second pattern of light is provided, the second pattern of light being different from the first pattern of light by a predetermined set of values. A shape control element is provided. At least one camera is disposed within the enclosure, the at least one camera having a camera optical axis and a camera pose in the frame of reference, the at least one camera is arranged in a predetermined geometrical relationship at least to the projector or to at least one other camera. A memory is provided having computer readable instructions. One or more processors operably coupled to the projector and the at least one camera, the one processors configured for executing the computer readable instructions. The computer readable instructions comprising: projecting from the projector a pattern of light in a first instance, the pattern of light being projected to a first position; generating the pattern of light by the shape control element with each of the first pattern of light and second pattern of light having a pattern pose; capturing with at least one camera a first image of the first pattern of light on the object in the first instance; changing the pose or shape of the pattern of light in a second instance using the pattern shape or pose control element; and determining a pattern pose or a shape information from both images about the pose or shape of the pattern; determining that the second image is valid based at least in part on the pattern pose or shape information differing in the first and second instance by more than predetermined measurement errors or the pattern pose or shape information differing less than predetermined measurement errors from values for the pattern pose or shape information that are based at least in part on the control values transmitted to the pattern pose and shape control element.

According to another aspect of the invention, a method of operating an manufacturing cell is provided. The method comprising: A method of operating a sensor, the method comprising: projecting from a projector a pattern of light in a first instance, the pattern of light being projected to a first position, the projector including a means for changing the first pattern of light to a second pattern of light, the pattern of light being generated by a shape control element with each of the first pattern of light and second pattern of light having a pattern pose; capturing with at least one camera a first image of the first pattern of light on the object in the first instance wherein the at least one camera is arranged in a predetermined geometrical relationship at least to the projector or to at least one other camera; changing the pose or shape of the pattern of light in a second instance using a pattern shape or pose control element; and determining with a processor a pattern pose or a shape information from both images about the pose or shape of the pattern; and determining with a processor that the second image is valid based at least in part on the pattern pose or shape information differing in the first and second instance by more than predetermined measurement errors or the pattern pose or shape information differing less than predetermined measurement errors from values for the pattern pose or shape information that are based at least in part on the control values transmitted to the pattern pose and shape control element.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Embodiments of the present invention provide advantages in providing automated inspection of objects being manufactured in an environment where human operators and robots operate in close proximity to each other. Embodiments of the present invention allow for cost effective inspection of objects being made or fabricated earlier in the manufacturing process to allow errors to be addressed earlier in the manufacturing process to reduce the cost of scrap and rework of the objects.

Figure 1:
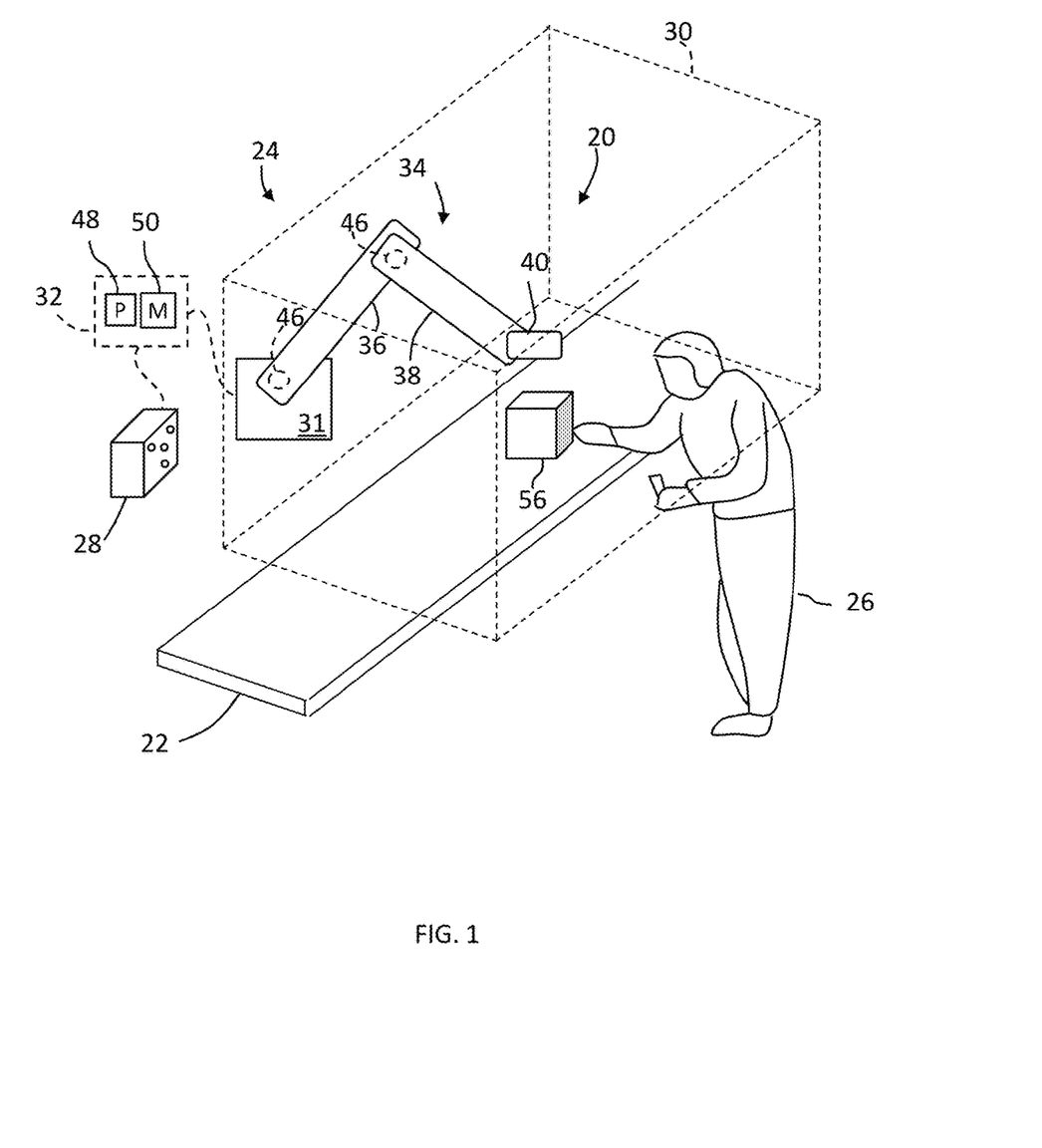
FIG. 1 is an illustration of a manufacturing cell having a human-centric robot in accordance with an embodiment of the invention.

Referring now to FIG. 1, a manufacturing cell 20 is illustrated in accordance with an embodiment. The cell 20 includes a work surface 22, such as a benchtop or a conveyor for example. In the exemplary embodiment, the cell 20 includes a robotic device 24, such as a human-centric robot for example. As used herein, a human-centric robot 24 is a robotic device that is configured to operate autonomously or semi-autonomously in close proximity to a human operator 26. As used herein, the phrase "close proximity" means that the human-centric robot 24 and the operator 26 are positioned such that portions of the human-centric robot 24 may move within areas that overlap with the human operator 26 during operations. The human-centric robot may also be referred to as a human-friendly, a collaborative robot or a human collaborative robot. As such, the human-centric robot 24 may include one or more sensors, such as sensor 28 for example, that determines whether the operator 26 and human-centric robot 24 are positioned such that a moving part of the human-centric robot is within a predetermined distance of the human operator such that there is a risk of contact. In an embodiment, a controller 32 is configured to alter the speed or movement of the human-centric robot 24 to either avoid contact or reduce the force on the human operator 26 in the event of contact. In one or more embodiments, the human-centric robot is configured to have a velocity at the point of contact of less than or equal to 25 meters/second, a maximum dynamic power of less than or equal to 80 Watts, or a maximum static force of less than or equal to 150 Newton.

The sensor 28 transmits a position signal that allows the determination of the relative positions of the human operator and the human-centric robot. In the exemplary embodiment, the position signal is not a function of the environmental or ambient lighting. In other words, the position signal is determined independently of the environmental light conditions.

In one embodiment, the human-centric robot may incorporate the characteristics for inherent safety described in the journal article "A New Actuation Approach for Human-centric Robot Design" by Zinn et al. (Int. J of Robotics Research, Vol. 23, No. 4-5, April-May 2004, pp. 379-398), the content of which is incorporated herein by reference. In another embodiment, the human-centric robot may include the characteristics described in journal article "Safety Evaluation of Physical Human-Robot Interaction via Crash Testing" by Haddadin et al. (Pro. of Robotics: Science and Systems III, June 2007), the content of which is incorporated herein by reference. In another embodiment, the human-centric robot may comply with ISO Standard ISO/DTS 15066:2016, ISO/TR 13482:2014 or ISO 10218-1:2011 for example, the contents of which are incorporated by reference herein.

It should be appreciated that the human-centric robot 24 may also include additional features, such as bumpers or padding for example, that reduces the risks associated with a robot operating autonomously or semi-autonomously in the proximity of a human operator. In the illustrated embodiment, the human-centric robot 24 includes a base 31 with an articulated arm 34 have two or more arm segments 36, 38. Arranged at the end of the arm 34 is an end effector 40. In an embodiment the end effector 40 includes a coupler that is sized to accept a tool. In an embodiment, the human-centric robot 24 operates within a defined area 30.

In one or more embodiments, the arm 34 further includes a plurality of transducers 46. In the exemplary embodiment, each one of the transducers 46 is associated with one of the axis of rotation of the arm segments 36, 38 to measure the rotation of the arm segment. The transducer 46 may be a rotary encoder for example. Each of the transducers 46 is electrically coupled to transmit a signal to the controller 32 in response to the rotation of the associated arm segment. In this manner, the controller 32 may determine the position and orientation of the end effector 40 and any portion of the arm 34. In an embodiment where the position of the end effector 40 and arm 34 may be determined, this data may be compared with data acquired from the sensor 28 to verify the operation of the robotic device 24.

It should be appreciated that while embodiments herein illustrate the human-centric robot as being stationary with a multi-axis articulated arm, this is for exemplary purposes and the claimed invention should not be so limited. In other embodiments, the human-centric robot may be mobile, have multiple articulated arms, have multiple actuators/couplers or a combination thereof for example.

Controller 32 is a suitable electronic device capable of accepting data and instructions, executing the instructions to process the data, and presenting the results. Controller 32 may accept instructions through user interface, or through other means such as but not limited to electronic data card, voice activation means, manually-operable selection and control means, radiated wavelength and electronic or electrical transfer. Therefore, controller 32 can be a microprocessor, microcomputer, a minicomputer, an optical computer, a board computer, a complex instruction set computer, an application specific integrated circuit (ASIC), a reduced instruction set computer (RSIC), an analog computer, a digital computer, a molecular computer, a quantum computer, a cellular computer, a superconducting computer, a supercomputer, a solid-state computer, a single-board computer, a buffered computer, a computer network, a desktop computer, a laptop computer, a scientific computer, a cellular phone or a hybrid of any of the foregoing.

Controller 32 is capable of converting the analog voltage level provided by sensors 28, encoders 46 or a reader circuit into a digital signal. In one embodiment, the sensors 28, encoders 46 or reader circuit may be configured to provide a digital signal to controller 32, or an analog-to-digital (A/D) converter (not shown) maybe coupled between sensor 28 and controller 32 to convert the analog signal into a digital signal for processing by controller 32. In other embodiments, the signals may be transferred between the sensor 28 and controller 32 by fiber optic cables. Controller 32 uses the digital signals act as input to various processes for controlling the human-centric robot 24. The digital signals represent one or more human-centric robot data including but not limited to the proximity distances to the human operator by the human-centric robot 24 or portions thereof.

In general, controller 32 accepts data and is given certain instructions for the purpose of comparing the data to predetermined parameters. The controller 32 compares the parameters to predetermined variances (e.g. the arm 34 is approaching the human operator) and if the predetermined variance is exceeded may generate a signal that may be used to change the operation of the human-centric robot or indicate an alarm to the human operator 26. In one embodiment, the controller 32 may be configured to transmit an alert signal to a remote computer (not shown) or to transmit a signal via another communications medium, such as a cellular SMS (text message) signal to a predetermined third party for example.

The controller 32 may include an electronic circuit. The electronic circuit may include a processor 48 coupled to one or more memory devices 50. The memory devices 50 may include random access memory (RAM) device, a non-volatile memory (NVM) device or a read-only memory (ROM) device. The processor 48 may also be coupled to one or more input/output (I/O) controllers and a LAN interface device via a data communications bus.

The memory devices store computer readable instructions or application code, e.g., main functionality firmware, including initializing parameters, and boot code, for the processor. Application code also includes program instructions for causing processor to execute any operation control methods, including starting and stopping operation, and determining the probability of the arm 34 contacting the human operator 26, based on a signal from the sensor 28, and generation of alarms. The application code may create an onboard telemetry system may be used to transmit operating information between the human-centric robot 24 and a remote terminal location and or/receiving location.

It should be appreciated that the controller 32 may be remotely located from the human-centric robot 24. In an embodiment, the human-centric robot 24 may include a communications circuit (e.g. WiFi, Bluetooth, cellular, Ethernet) that transmits signals to the remotely located controller 32. In one embodiment, the controller 32 may be a cellular phone that connects to the human-centric robot 24 via a wired or wireless communications medium.

In one embodiment, the manufacturing assembly line 20 receives an object 56 that will be processed by the human-centric robot 24, the human operator 26, or a combination thereof. It should be appreciated that while the object 56 is illustrated as a single item, this is for exemplary purposes and the object 56 may be comprised of a plurality of components or subassemblies that may require assembly by the human-centric robot 24 or the human operator 26. The plurality or collection of components or subassemblies may be arranged in a kit for example. The object 56 may also require fabrication process steps, such as but not limited to machining, welding, bonding for example. The object 56 may also require chemical processing for example.

Figure 2:
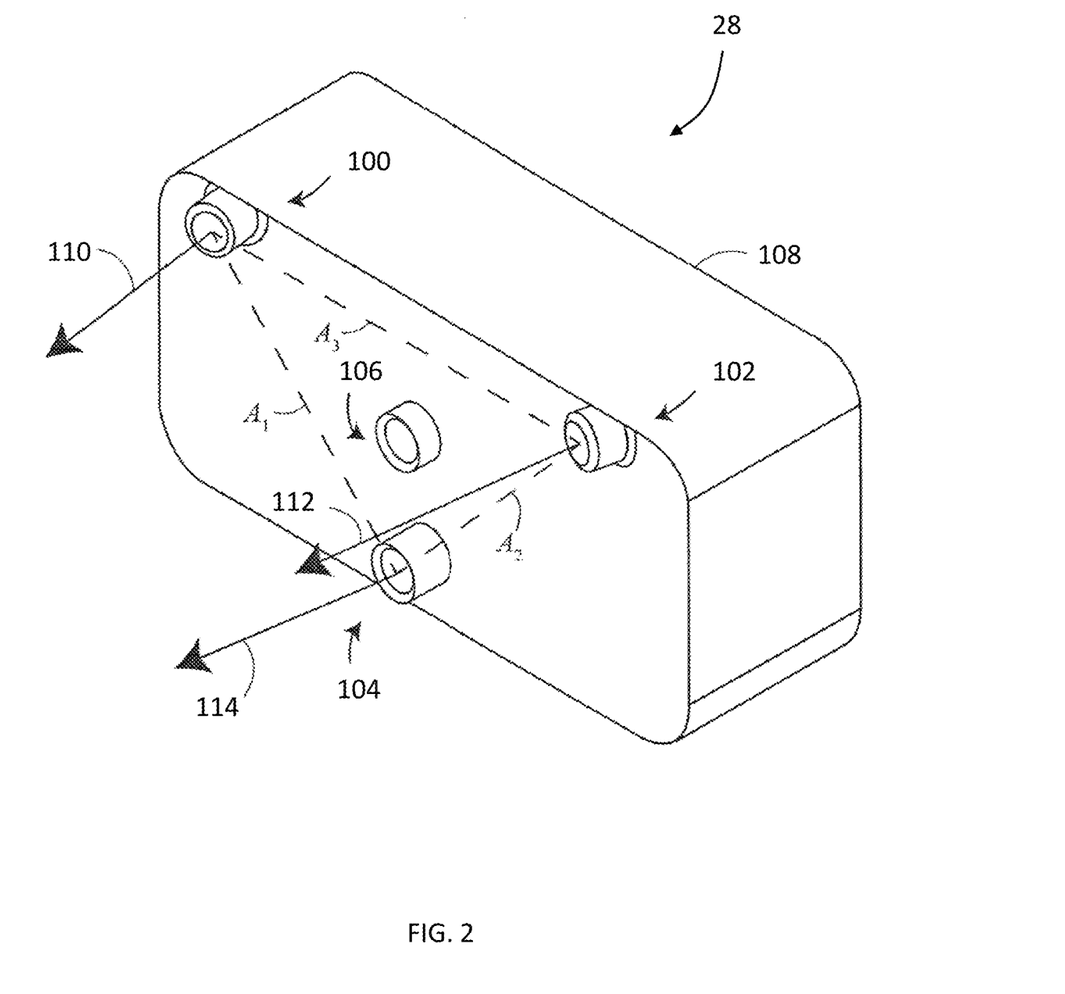
FIG. 2 is a perspective view of a noncontact sensor for use with the human-centric robot of FIG. 1 in accordance with an embodiment of the invention.

Referring now to FIG. 2, an embodiment is shown of the sensor 28. In the illustrated embodiment, the sensor 28 is a 3D imager having two cameras 100, 102 and a projector 104. In an embodiment, the 3D imager 28 of FIG. 2 further includes a camera 106 that may be used to provide color (texture) information for incorporation into the 3D image. In addition, the camera 106 may be used to register multiple 3D images through the use of videogrammetry.

As used herein, the term "projector" is defined to generally refer to a device for producing a pattern. The generation of the pattern can take place by means of deflecting methods, such as generation by means of diffractive optical elements or micro-lenses (or single lasers), or by shading methods, for example the production by means of shutters, transparencies (as they would be used in a transparency projector) and other masks. The deflecting methods have the advantage of less light getting lost and consequently a higher intensity being available.

The cameras 100, 102, 106 and projector 104 may be arranged in a fixed geometric relationship by an enclosure 108. The enclosure 108 is fixed with respect to a frame of reference. As will be discussed in more detail below, in one or more embodiments, the camera 100 is oriented such that a vector 110 extends from the perspective center of camera 100 normal to the camera 100 reference plane (e.g. the plane of the sensor pixel array). Similarly, the camera 102 is oriented such that a vector 112 extends from the perspective center of camera 102 normal to the camera 102 reference plane (e.g. the plane of the sensor pixel array). The projector 104 is also oriented such that a vector 114 extends through the perspective center of the projector normal to the projector reference plane. The vectors 110, 112 are oriented relative to each other to allow the cameras 100, 102 to acquire images emitted by the projector 104. In one or more embodiments, the vectors 110, 112 are angled relative to each other and the vector 114 such that the fields of view (FOV) of the cameras 100, 102 overlap with each other and the image emitted from the projector 104 on the surfaces of one or more objects, such as objects within the area 30 for example. The relative orientations of the cameras 100, 102 and projector 104 define a pose for each camera 100, 102 and projector 104 respectively in the frame of reference. In one more embodiments, the vectors 110, 112, 114 are coaxial with the respective optical axis of the cameras 100, 102 and projector 104.

Figure 3:
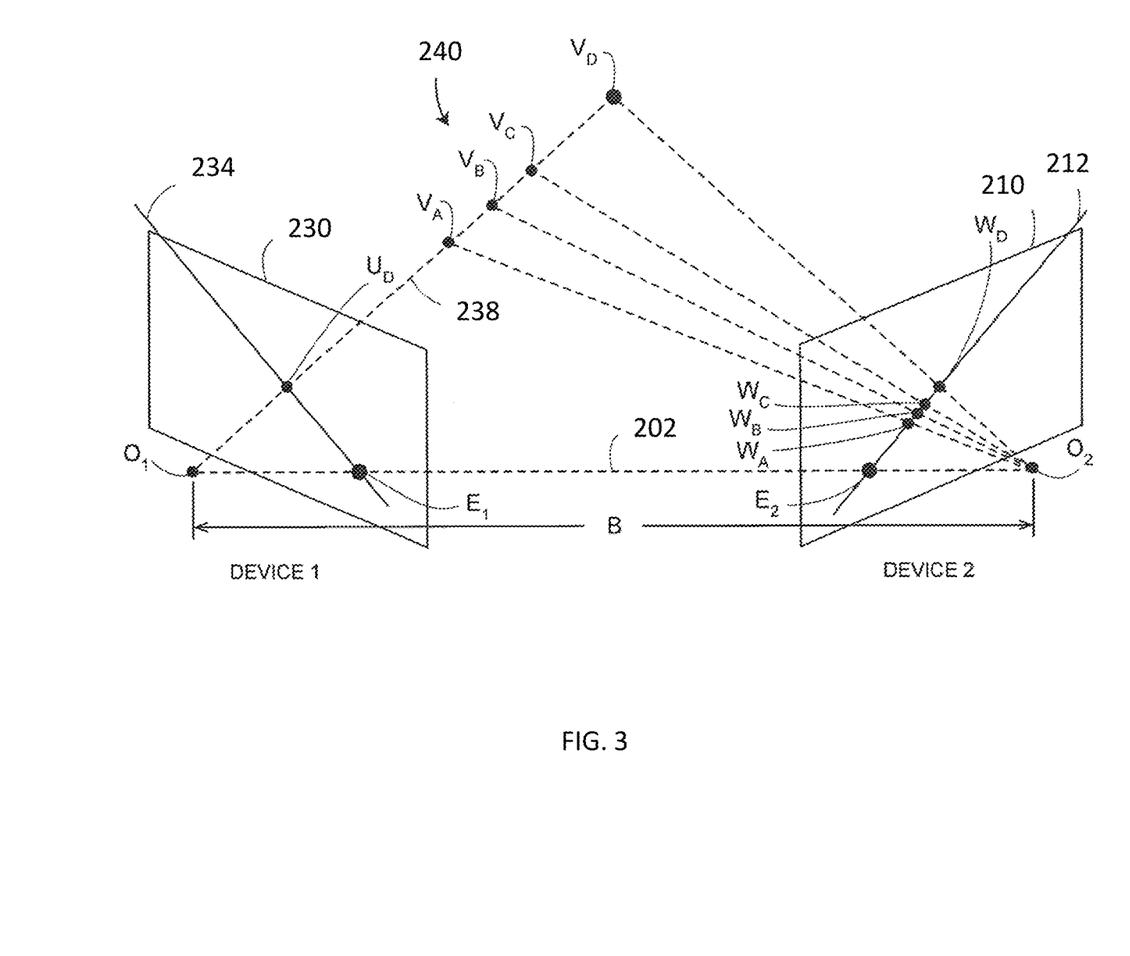
FIG. 3 is a schematic illustration of the sensor of FIG. 2 in accordance with an embodiment of the invention.

In the illustrated embodiment, the cameras 100, 102 and projector 104 are arranged in a triangle A1-A2-A3. This triangular arrangement provides additional information beyond that available for two cameras and a projector arranged in a straight line. In an embodiment, the triangular arrangement is arranged in a plane no coincident with the projector optical axis, the camera 100 optical axis and the camera optical axis. The additional information may be understood in reference to FIG. 3, which illustrates the concept of epipolar constraints, and FIG. 4 that illustrates how epipolar constraints are advantageously applied to the triangular arrangement of the 3D imager 28. In FIG. 3, a 3D triangulation instrument 240 includes a device 1 and a device 2 on the left and right sides of FIG. 3, respectively. Device 1 and device 2 may be two cameras 100, 102 or device 1 and device 2 may be one camera and one projector 104. Each of the two devices, whether a camera or a projector, has a perspective center, O1 and O2, and a representative plane, 230 or 210. The perspective centers are separated by a baseline distance B, which is the length of the line 202. Basically, the perspective centers O1, O2 are points through which rays of light may be considered to travel, either to or from a point on an object. These rays of light either emerge from an illuminated projector pattern, such as the pattern on illuminated projector pattern generator, or impinge on a photosensitive array.

In FIG. 3, for the reference plane 230 angled toward the perspective center O2 and the reference plane 210 angled toward the perspective center O1, a line 202 is drawn between the perspective centers O1 and O2 that crosses the planes 230 and 210 at the epipole points E1, E2, respectively. Consider a point $U_D$ on the plane 230. If device 1 is a camera 100, it is known that an object point that produces the point $U_D$ on the image lies on the line 238. The object point might be, for example, one of the points $V_A$, $V_B$, $V_C$, or $V_D$. These four object points correspond to the points $W_A$, $W_B$, $W_C$, $W_D$, respectively, on the reference plane 210 of device 2. This is true whether device 2 is a camera or a projector. It is also true that the four points lie on a straight line 212 in the plane 210. This line, which is the line of intersection of the reference plane 210 with the plane of $O_1$-$O_2$-$U_D$, is referred to as the epipolar line 212. It follows that any epipolar line on the reference plane 210 passes through the epipole $E_2$. Just as there is an epipolar line on the reference plane of device 2 for any point on the reference plane of device 1, there is also an epipolar line 234 on the reference plane of device 1 for any point on the reference plane of device 2.

Figure 4:
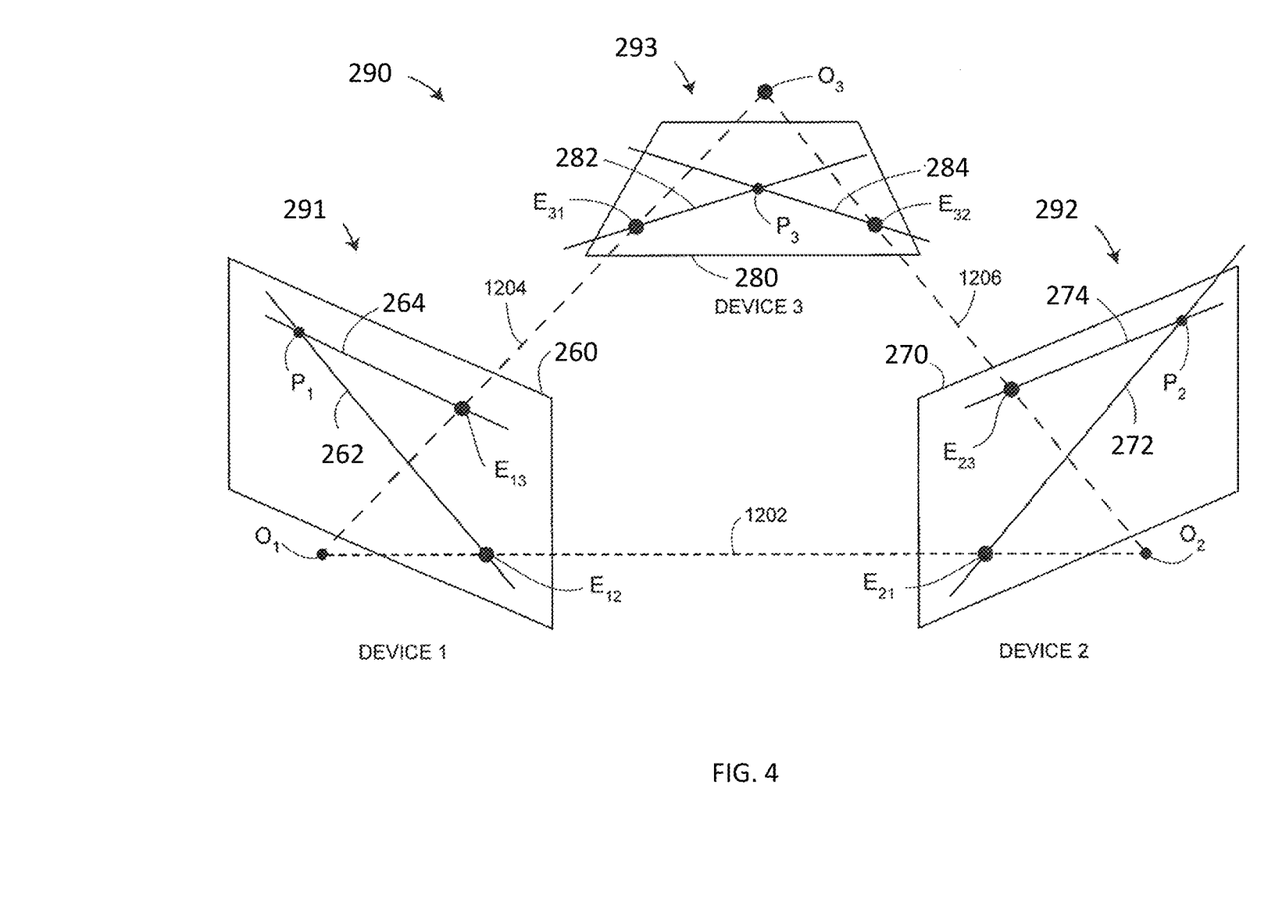
FIG. 4 is a schematic illustration of the sensor of FIG. 2 in accordance with another embodiment.

Referring now to FIG. 4 the epipolar relationships for a 3D imager 290 are illustrated that correspond with 3D imager 28 of FIG. 2 in which two cameras and one projector are arranged in a triangular pattern. In general, the device 1, device 2, and device 3 may be any combination of cameras and projectors as long as at least one of the devices is a camera. Each of the three devices 291, 292, 293 has a perspective center $O_1$, $O_2$, $O_3$, respectively, and a reference plane 260, 270, and 1280, respectively. Each pair of devices has a pair of epipoles. Device 1 and device 2 have epipoles $E_{12}$, $E_{21}$ on the planes 260, 270, respectively. Device 1 and device 3 have epipoles $E_{13}$, $E_{31}$, respectively on the planes 260, 280, respectively. Device 2 and device 3 have epipoles $E_{23}$, $E_{32}$ on the planes 270, 280, respectively. In other words, each reference plane includes two epipoles. The reference plane for device 1 includes epipoles $E_{12}$ and $E_{13}$. The reference plane for device 2 includes epipoles $E_{21}$ and $E_{23}$. The reference plane for device 3 includes epipoles $E_{31}$ and $E_{32}$.

In an embodiment, device 3 is a projector 104, device 1 is a first camera 100, and device 2 is a second camera 102. Suppose that a projection point $P_3$, a first image point $P_1$, and a second image point $P_2$ are obtained in a measurement. These results can be checked for consistency in the following way.

To check the consistency of the image point $P_1$, intersect the plane $P_3$-$E_{31}$-$E_{13}$ with the reference plane 260 to obtain the epipolar line 264. Intersect the plane $P_2$-$E_{21}$-$E_{12}$ to obtain the epipolar line 262. If the image point $P_1$ has been determined consistently, the observed image point $P_1$ will lie on the intersection of the determined epipolar lines 262 and 264.

To check the consistency of the image point $P_2$, intersect the plane $P_3$-$E_{32}$-$E_{23}$ with the reference plane 270 to obtain the epipolar line 274. Intersect the plane $P_1$-$E_{12}$-$E_{21}$ to obtain the epipolar line 272. If the image point $P_2$ has been determined consistently, the observed image point $P_2$ will lie on the intersection of the determined epipolar lines 272 and 274.

To check the consistency of the projection point $P_3$, intersect the plane $P_2$-$E_{23}$-$E_{32}$ with the reference plane 280 to obtain the epipolar line 284. Intersect the plane $P_1$-$E_{13}$-$E_{31}$ to obtain the epipolar line 282. If the projection point $P_3$ has been determined consistently, the projection point $P_3$ will lie on the intersection of the determined epipolar lines 282 and 284.

The redundancy of information provided by using a 3D imager 290 having a triangular arrangement of projector and cameras may be used to reduce measurement time, to identify errors, and to automatically update compensation/calibration parameters.

It should be appreciated that since the geometric configuration of device 1, device 2 and device 3 are known, when the projector 293 emits a point of light onto a point on an object that is reflected captured by cameras 291, 292, that the distance from the 3D imager 290 to the object may be determined. When the position and orientation of the 3D imager 290 is known, then the 3D coordinates of the point may be determined. In an embodiment, rather than projecting a single point P3, the projector 293 is configured to project a pattern image, such as an array 300 of elements 302 illustrated in FIG. 5. In one or more embodiments, the elements 302 in array 300 are points of light. In an embodiment, the elements 302 are Gaussian shaped. In some instances, the 3D imager 290 is able to determine a correspondence between the some of the individual elements 302 in array 300 and the images recorded by the cameras 291, 292 based on the epipolar constraints discussed above.

Figure 5:
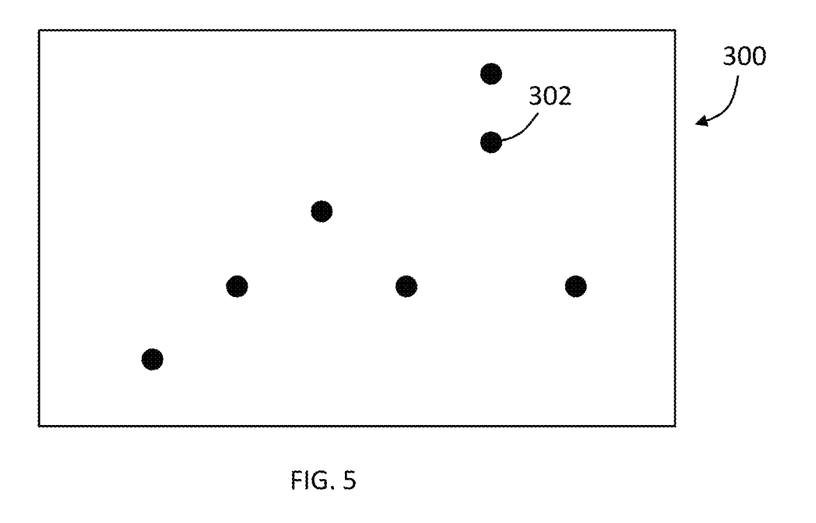
FIG. 5 is an illustration of a pattern of light projected by the noncontact sensor.

It should be appreciated that as the density of the elements 302 in array 300 are increased, the probability that multiple points will lie on an epipolar line increases. When multiple points are located on an epipolar line, additional steps are utilized to identify the correspondence between each of the projected elements and the identified elements in the image recorded by the camera's 291, 292. In an embodiment, the potential correspondence is determined by checking if a ray from a laser beam emitted by the projector 293 extends through the 3D point. It should be appreciated that as the density of the elements 302 increases, the number of false correspondences increases (referred to herein as "stray points"). In an embodiment, the array 300 has a "sparse" element density. As used herein, a sparse density of the elements 302 is a density where there are a significantly less number of elements in the array 300 relative to the number of pixels in the camera's 291, 292. In an embodiment, the ratio of elements to pixels is less than 0.1. In another embodiment, the ratio is less than 0.01. In an embodiment, the array 300 has 11,000 elements and the camera's 291, 292 each of have image sensors with 1,300,000 pixels.

Figure 6:
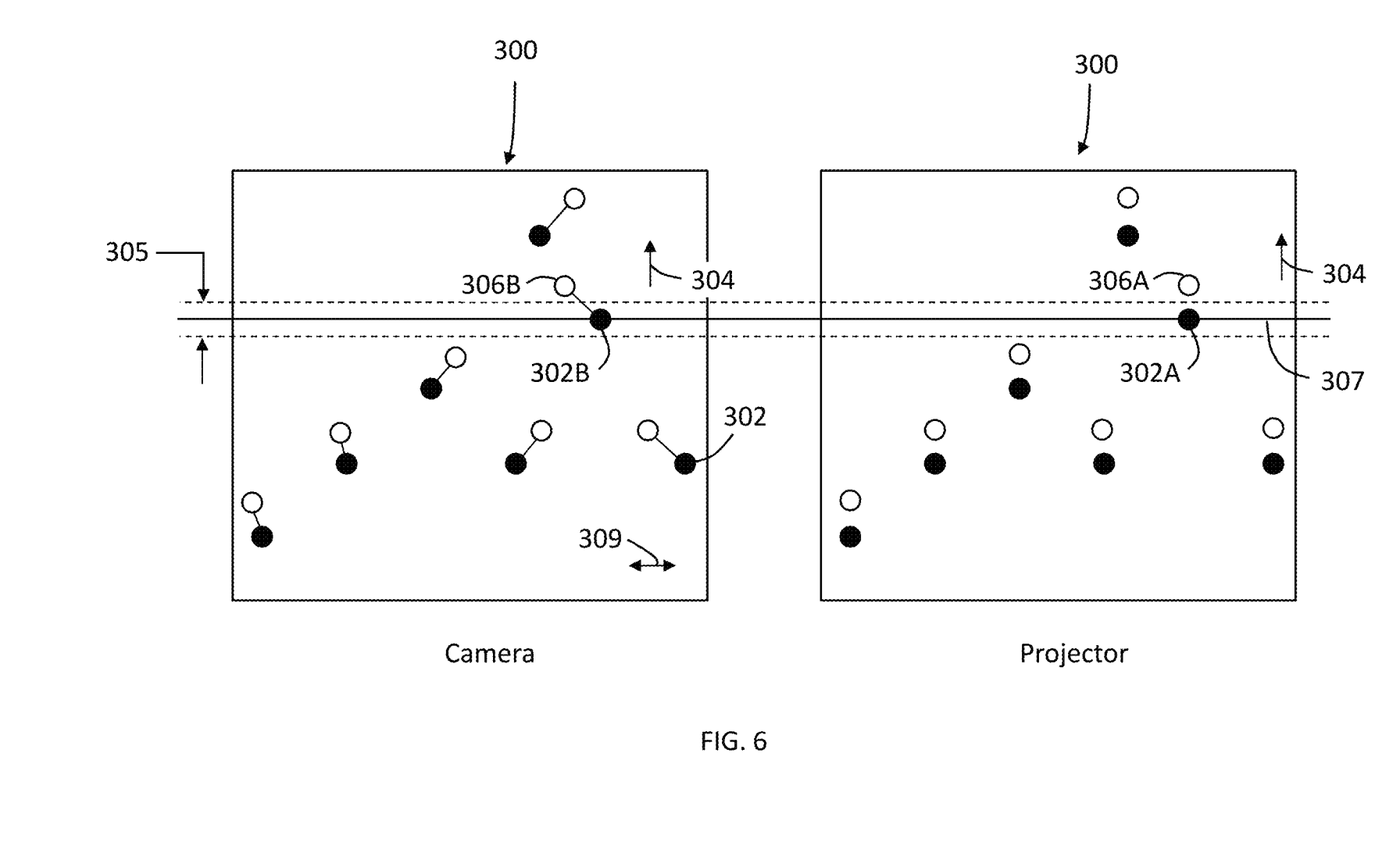
FIG. 6 is an illustration of the pattern of light projected by a projector and an image acquired by a camera of the noncontact sensor.
Figure 7:
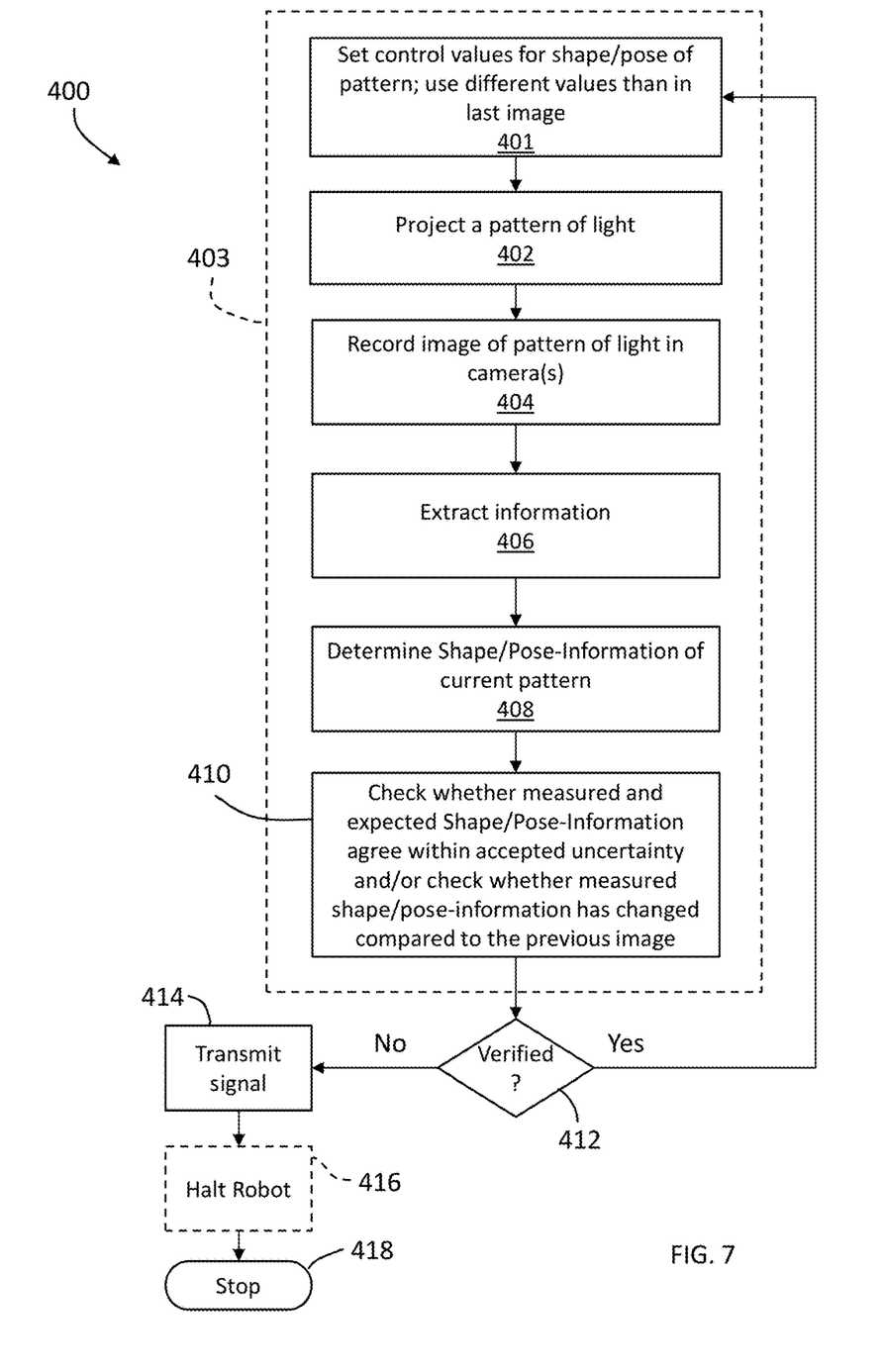
FIG. 7 is a flow diagram of a method of operating the human-centric robot of FIG. 1, in an accordance with an embodiment.

In an embodiment where the 3D imager is used as a sensor 28 with a human-centric robot 24, it is desirable to perform a self-checking process for validating, confirming or verifying that the images (e.g. FIG. 5) acquired by the camera's 291, 292 are valid current acquisitions and not only data frozen in a state on a way between the camera chip/sensor and the processing algorithms from the pattern image emitted by the projector 293. Referring now to FIG. 5-7, a method 400 for verifying that the image(s) and with it the imaged pattern, such as array 300 for example and if available the 'background image', i.e. the imaged background light (not from structured illumination) is valid. The method 400 begins in block 401 with setting the control values for shape or pose of the pattern and continues with block 402 with the emitting of a first pattern of light with the projector 293. As discussed above, in the illustrated embodiment the first pattern of light is an array 300 comprised of elements such as a spot of light 302.

In one or more embodiments, 3D imager 290 includes a means for changing the first pattern of light to the second pattern of light. In an embodiment the second light pattern is formed by tilting the first light pattern from a first direction to a second direction. In this embodiment, the 3D imager 290 may provide of the means for changing the light pattern using a device or component such as, but not limited to: a tilting mirror (e.g. piezoelectric, micro-electromechanical system or MEMS, magnetic), a movable mirror on a translational stage/slide, a tilting reflective diffractive optical element (e.g. piezoelectric, micro-electromechanical system or MEMS, magnetic), a rotating Risley prism or prism pair, an acousto-optical deflector, an optical crystal, an electro-optical deflector, a dynamical diffractive optical element, an array of addressable laser sources, a special light generator. In one or more embodiments, the means for changing the light pattern may include diffraction, such as a spatial light generator that generates the pattern and control of the angular position of the pattern, or changes the pattern itself. In one or more further embodiments, the means for changing the pattern may be performed by a DMD mirrors, transmissive masks, reflective masks, microlens arrays with a mask, LCD elements, or LCoS elements.

The method 400 then proceeds to block 404 where images are recorded by the one or more cameras 291, 292 of the first pattern of light that is reflected off of one or more objects. In the embodiment of FIG. 1, the objects may include the human-centric robot 24, the operator 26 or the object 56. The method 400 then proceeds to block 406 where the information is extracted from the images, that is used e.g. for performing the surveying tasks of the sensor. This could be done using the 'background image' or using the image(s) of the pattern which can be processed into 3D coordinates. 3D coordinates of the one or more objects are determined using the epipolar relationships described herein with reference to FIG. 3 and FIG. 4.

The method 400 then proceeds to block 408 where the shape or pose information is determined from the images. The shape or pose information is generated from the acquired images. Its information about the pattern to identify whether the pattern has changed at all or in a predefined way between two acquisitions.

The method 400 loops to project a second pattern of light 306A emitted from the projector 290. In the embodiment illustrated in FIG. 7, the second pattern of light may be simply a change in the pattern pose or the pattern shape of the first pattern of light. In an embodiment, the second pattern of light is geometrically identical to the first pattern of light and is offset by a predetermined distance and direction. In the exemplary embodiment, the direction of the offset is in a direction not along the epipolar line in which the elements of the first pattern of light are located. In one or more embodiments, the direction of the offset may be in a direction perpendicular to the epipolar lines, such as that indicated by arrow 304. By offsetting the second pattern of light in a direction off of the epipolar line, the method 400 may verify the operation of the sensor. As shown in FIG. 6, the amount the pattern is moved may be determined based on an uncertainty range 305 about the epipolar line 307. It should be appreciated that at least one of the elements 302A lies on the epipolar line 307 in the projector view and which corresponds to element 306B in the image acquired by the camera. By shifting the elements, such as element 306A by a distance larger than the uncertainty range 305, it can be verified that the movement of element 306B imaged by the camera is due to the movement of the pattern of light and not simply due to the uncertainty in the measurement. In some embodiments, the elements, such as element 306 imaged by the camera may be shifted in the direction along the epipolar line 307, as indicated by arrow 309, due to a change in depth. The change in depth may be due to a movement of the object or the movement of the pattern of light.

In an embodiment, the first image of the first pattern of light may be used only for comparison with the second image of the second pattern of light. In this embodiment, the first image (and associated data/information) is used only for the purposes of validity and not the proximity of the robot to the human operator, which is determined from the second image.

It should be appreciated that patterns illustrated in FIG. 6 show a first image (where the first pattern light with element 302A/302B is projected/imaged) and a second image (where the changed pattern of light with element 306A/306B is projected/imaged) superimposed upon one another. This is for explanatory purposes and clarity. In operation, only one of the patterns of light may be imaged at the same time. It should further be appreciated that the changing of the pattern of light may occur with each measurement step, or the measurement may be compared with the pattern position or pattern shape acquired during the previous measurement.

In one or more embodiments, the coordinates of the elements (both for the first pattern of light and second pattern of light) on the object are determined with six-degrees of freedom.

The method 400 then proceeds to block 410 where it is determined whether the elements of the second light pattern (e.g. the light pattern in the second position) are located at a position that is offset in the predetermined distance and direction (e.g. element 306B, FIG. 6). In addition or alternatively, in some embodiments it is checked whether the shape or pose information has changed with respect to the previous image acquisition. In an embodiment, the steps of blocks 401-412 define a verification module 403. As discussed in more detail herein, the verification module may be used to determine if the sensor 28 is functioning as desired.

In query block 412 is checked based on the information gained in block 410 whether the images and thus the information extracted in block 406 is valid. In one or more embodiments, the information will be considered valid if the pattern shape or pose information has changed with respect to the previous measurement, in other embodiments an additional check will be used for validation: whether the shape or pose information agrees with the values expected from the control values for the pattern shape and pose control that are set in block 401. When the position of the second light pattern is verified as being in the predetermined direction and distance, the method 400 loops back to block 401 and the process continues. In one or more embodiments, the image of the second light pattern becomes the first light pattern of a subsequent verification process.

When the position of the second light pattern is not verified in query block 412, the 3D coordinates of the object being measured (e.g. the human-centric robot and/or the human operator) cannot be determined with the desired level of confidence. As a result, the risk of an undesired contact between the human-centric robot and the human operator may increase.

In one or more embodiments, when query block 412 returns a negative, meaning the position of the second light pattern does not correspond to the predetermined distance and direction, the method 400 proceeds to block 414 where a signal is transmitted. The signal may be an electronic, visual (e.g. warning light) or audible (e.g. an audio alarm). In one or more embodiments, the signal is transmitted from the sensor 28 to the controller 32. In one or more embodiments, the method 400 may proceed to block 416 where the signal may cause the human-centric robot to rapidly stop motion to avoid undesired contact with the human operator. The method 400 then stops in block 418.

It should be appreciated that the method 400 provides advantages in allowing the use of a 3D imager 290 in a sensor 28 for preventing or reducing the risk of undesired contact between the human-centric robot and the operator independently from the structure in the environment and the environmental lighting conditions. Thus, the sensor 28 provides a self-checking system to confirm operation of the sensor. This may provide further advantages where the sensor is moving (e.g. on a mobile platform, a robot or a gantry crane) where the reliance of prior art sensor systems on environmental or ambient lighting may result in reduced reliability of the sensor.

It should be appreciated that the method 400 may include additional steps or process actions. For example, in one or more embodiments the method 400 may determine a potential time to contact between the human-centric robot and human operator. When the potential time to contact is above a threshold, the method 400 may perform a reacquisition process where the method 400 loops back to block 402 and attempts to reestablish the 3D coordinates of the measured objects. In this embodiment, the threshold is a time greater than the amount of time used to perform the reacquisition steps (e.g. the verification may be performed prior to contact with a desired safety factor). In one or more embodiments, the method 400 may have a predetermined number of negative verifications in query block 412 prior to transmitting the signal or halting the movement of the human-centric robot.

Figure 8:
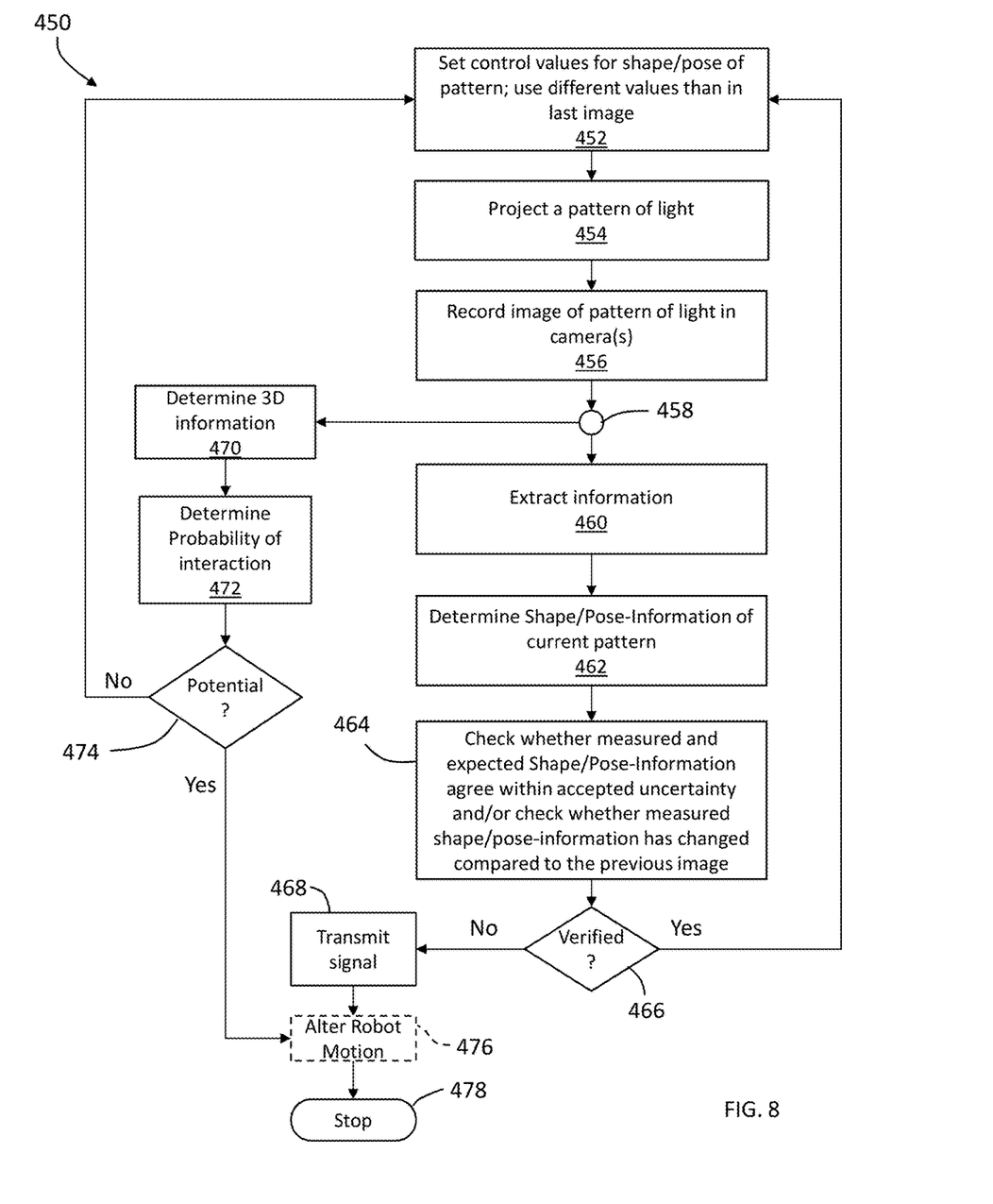
FIG. 8 is a flow diagram of a method of operating the human-centric robot of FIG. 1, in accordance with another embodiment.

Referring now to FIG. 8 another embodiment is shown of a method 450 for monitoring the operation of a cell 20, such as a manufacturing cell for example. In this embodiment, the method 450 starts in block 452 where the control values for the shape or pose of the pattern of light for the projector 293 of imager 290 are set. The method 450 then proceeds to block 454 where images are recorded by one or more cameras 291, 292 of the first pattern of light that is reflected off of one or more objects. In the embodiment of FIG. 1, the objects may include the human-centric robot 24, the operator 26 or the object 56. The method 400 then proceeds to block 406 where the information is extracted from the images, that is used e.g. for performing the surveying tasks of the sensor. This could be done using the 'background image' or using the image(s) of the pattern which can be processed into 3D coordinates. 3D coordinates of the one or more objects are determined using the epipolar relationships described herein with reference to FIG. 3 and FIG. 4.

The method 450 then proceeds to block 456 where an image of the pattern of light is acquired. In an embodiment, the method 450 bifurcates at connector 458 into two parallel processes. The first process, represented by blocks 460-468 determine the shape or pose and verify the operation of sensor 28. The second process, represented by blocks 470-474 determine the 3D coordinates of the operator and the human-centric robot. From the 3D coordinates, it can be determined if there is a probability of contact between the operator and the human-centric robot.

The first process starts by determining the shape or pose information from the acquired images in block 460. The image of the pattern of light is used to identify whether the pattern has changed at all or in a predefined manner between two image acquisitions. The method 450 then proceeds compare the shape/pose information in with a previous image of the light pattern block 462. Then a check is performed to determine whether measured and expected Shape/Pose-Information agree within accepted uncertainty and/or check whether measured shape/pose-information has changed when compared to the previous image in block 464. In an embodiment, the method 450 changes (in block 452) the shape/pose of the pattern of light in each iteration by offsetting the light pattern a predetermined distance from the pattern of light from a previous iteration.

As discussed herein with respect to FIG. 7, by shifting the elements, such as element 306A by a distance larger than the uncertainty range 305, it can be verified that the movement of element 306B imaged by the camera is due to the movement of the pattern of light and not simply due to the uncertainty in the measurement. In some embodiments, the elements, such as element 306 imaged by the camera may be shifted in the direction along the epipolar line 307, as indicated by arrow 309, due to a change in depth. The change in depth may be due to a movement of the object or the movement of the pattern of light.

The method 450 then proceeds to block 466 where it is determined whether image is valid by determining if the elements of the current light pattern are located at a position that is offset in the predetermined distance and direction from the previous light pattern. In one or more embodiments, the image acquired by sensor 28 will be considered valid if the image of the shape or pose of the pattern of light has changed (e.g. by a validation threshold) with respect to the previous measurement. In other embodiments an additional check will be used for validation, such as by determining whether the shape or pose of the pattern of light in the image agrees with the values expected from the control values for the pattern of light that are set in block 452. When the position of the current light pattern is verified as being in the predetermined direction and distance, the method 450 loops back to block 452 and the process continues.

When the position of the current light pattern is not verified in query block 466, the 3D coordinates of the object being measured (e.g. the human-centric robot and/or the human operator) cannot be determined with the desired level of confidence. As a result, the risk of an undesired contact between the human-centric robot and the human operator may increase.

In one or more embodiments, when query block 412 returns a negative, meaning the position of the current light pattern does not correspond to the predetermined distance and direction, the method 450 proceeds to block 468 where a signal is transmitted. The signal may be an electronic, visual (e.g. warning light) or audible (e.g. an audio alarm). In one or more embodiments, the signal is transmitted from the sensor 28 to the controller 32.

In parallel with the verification process of blocks 460-468, the method 450 also proceeds to block 470 where 3D coordinate data of the operator and the human-centric robot are determined. In an embodiment, the 3D coordinate data is determined for the operator and the human-centric robot based on the acquired images of the light pattern. In another embodiment, the 3D coordinate data is determined from the acquired image of the light pattern only for the operator, while the 3D coordinate information from the human-centric robot may be determined from sensors on the human-centric robot, such as transducers 46 for example. In this way the volume of space occupied by the operator and the volume of space occupied by the human-centric robot may be determined.

The method 450 then proceeds to block 472 where a probability of an interaction or undesired contact between the operator and human-centric robot is determined. It should be appreciated that an interaction may not be actual contact, but may be a situation where a portion of the human-centric robot is within a predetermined distance of the operator, or a situation where a portion of the human-centric robot is approaching the operator at a rate/velocity above a predetermined threshold.

The method 450 then proceeds to query block 474 where it is determined if the probability of interaction is above a predetermined threshold (e.g. a probability threshold). When the query block 474 returns a negative, in other words a low or no probability of interaction, the method 450 loops back to block 452 and the process begins again.

When the query block 474 returns a positive (probability of impact above a threshold), the method 450 proceeds to block 476 where the motion or position of the human-centric robot is altered. In one embodiment, the human-centric robot is stopped/halted. In another embodiment, the motion of the human-centric robot is changed (e.g. a change in direction or speed) to reduce the probability of interaction to be below the predetermined threshold. In one embodiment, when the query block 466 returns a negative (i.e. image not verified), the method 450 also proceeds to block 476. Once the motion of the human-centric robot is altered, the method 450 stops in block 478.

Figure 9:
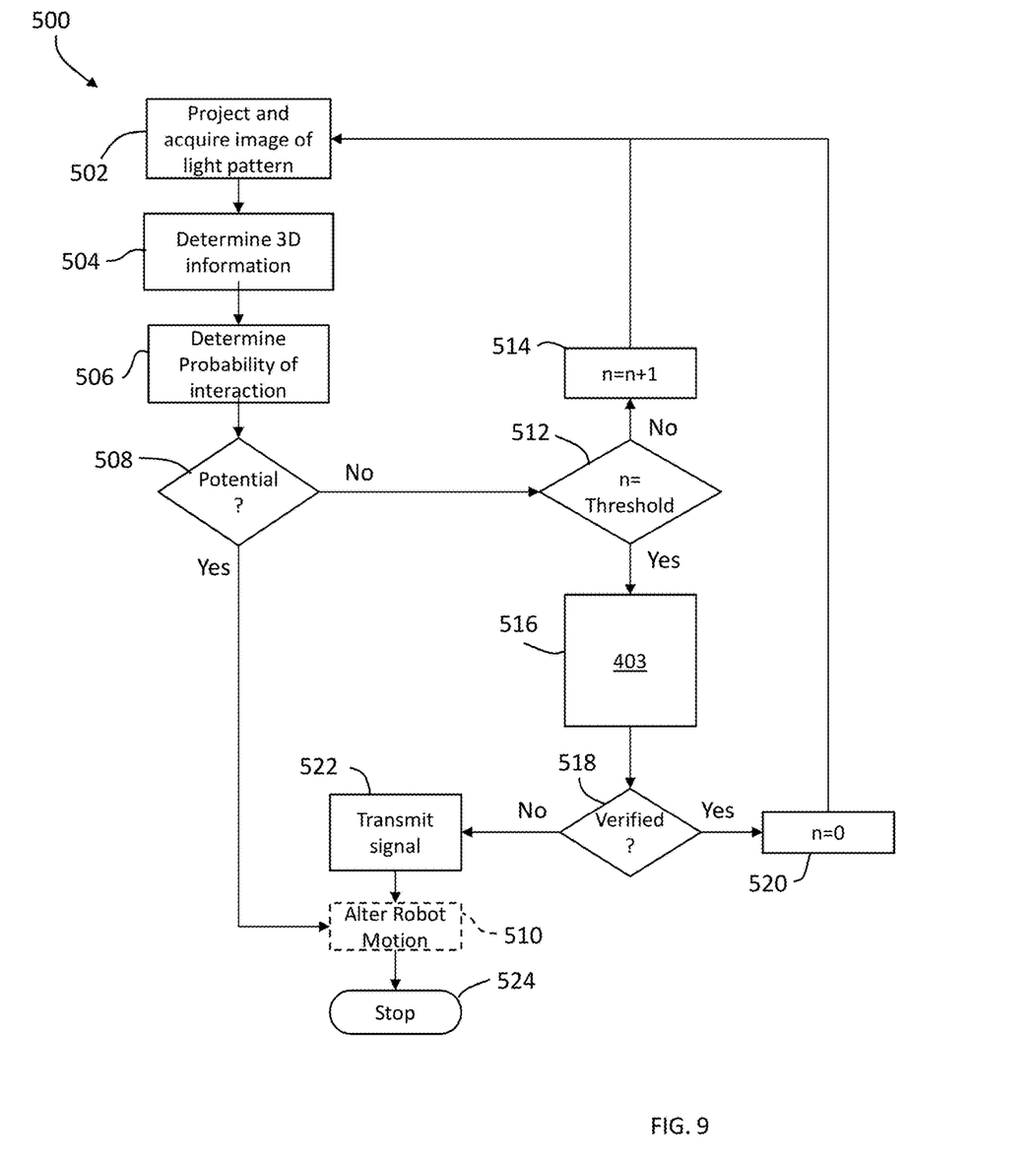
FIG. 9 is a flow diagram of a method of operating the human-centric robot of FIG. 1, in accordance with another embodiment.

It should be appreciated that in the embodiment of FIG. 8, the verification of the images is continuously performed. In other words, the verification of the image is performed for each iteration of method 450. In some embodiments, it may be desired to perform the image verification on a periodic or aperiodic basis. This may be done to reduce the computational load (such as on controller 32) caused by the continuous changing of the shape/pose of the light pattern and the comparison of images. Referring now to FIG. 9, an embodiment of a method 500 is shown where the verification process is performed on a periodic basis.

The method 500 starts in block 502 where the light pattern is projected into the cell 20 and an image of the light pattern is acquired. The method then proceeds to block 504 where the 3D coordinate data for the operator and the human-centric robot are determined. The method 500 then proceeds to block 506 where the probability of interaction is determined. In an embodiment the steps of block 504 are the same as block 470 and the steps of block 506 are the same as block 472 of FIG. 8. The method 500 then proceeds to query block 508 where it is determined if the probability of interaction is above a predetermined threshold. When the query block 508 returns a positive, the method 500 proceeds to block 510 where the motion of the robot is altered as is described herein with respect to block 476 of FIG. 8.

When the query block 508 returns a negative, meaning the probability of interaction is below a threshold, the method 500 proceeds to query block 512. In query block 512 it is determined whether a counter "n" equals a threshold. In the exemplary embodiment, the threshold for counter "n" equals the number of iterations (e.g. the number of loops of method 500) performed between image verifications. When the query block 512 returns a negative (i.e. threshold not reached), the method 500 proceeds to block 514 where the counter "n" is incremented by 1 and then loops back to block 502 to start another iteration. When the query block 512 returns a positive (i.e. counter threshold reached), the method 500 proceeds to the verification module 403 in block 516. The verification module 403 is described herein with respect to FIG. 7 and will not be repeated here for brevity.

The method 500 receives the output of block 516 and determines whether the image is verified in query block 518. When query block 518 returns a positive, meaning the image is verified and the sensor 28 is operating as desired, the method 500 proceeds to block 520 where the counter "n" is reset to zero and then loops back to block 502. When the query block 518 returns a negative, meaning the image is not or could not be verified and thus the operation of the sensor 28 cannot be verified, the method 500 proceeds to block 522 where a signal is transmitted to alert the operator that the sensor 28 may not be operating as desired. The method 500 then proceeds to block 510 where the motion of the human-centric robot is altered (e.g. stopped/halted). The method 500 then stops in block 524.

It should be appreciated that while embodiments herein refer to the use of the sensor 28 in cooperation with a human-centric robot, this is for exemplary purposes and the claimed invention should not be so limited. In one or more other embodiments, the sensor 28 may be used with semi-automated or manually operated equipment, such as cranes, gantries, conveyor systems, escalators, elevators, doors and the like. In still further embodiments, the sensor 28 may be used in place of a proximity sensor.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of operating a sensor, the method comprising:
    projecting from a projector a pattern of light in a first instance, the pattern of light being projected to a first position, the projector being operable to change the pattern of light based on a control value, the pattern of light being generated by a shape control element, wherein the pattern of light in the first instance is defined at least in part on a first control value;
    capturing with the at least one camera a first image of the pattern of light on the object in the first instance, wherein the at least one camera is arranged in a predetermined geometrical relationship at least to the projector or to at least one other camera;
    determining based at least in part on the pattern of light in the first image, three-dimensional coordinates of at least one point on at least one of an operator and an object;
    changing the pose or shape of the pattern of light in a second instance using the shape control element, the change in the pose or shape of the pattern of light in the second instance being defined by a second control value;

capturing with the at least one camera a second image of the pattern of light in the second instance;

determining with a processor a change in the pose or a shape of the pattern of light between the first image and the second image; and determining with a processor that the second image is valid based at least in part on the change in the pose or shape being different within a validation threshold, the validation threshold being based in part on a difference between the first control value and the second control value.

2. The method of claim 1, further comprising altering at least one of a direction and velocity of the object in response to a probability of an interaction that includes the operator being equal to or above a predetermined probability threshold.

3. The method of claim 1, further comprising determining the 3D coordinates a plurality of instances, wherein the determination that the second image is valid is performed in each of the plurality of instances.

4. The method of claim 1, further comprising determining the 3D coordinates a plurality of instances, wherein the determination that the second image is valid is performed in once during the plurality of instances.

5. The method of claim 1, further comprising transmitting a signal based at least in part on the pose or shape of the pattern of light in the second image not being different from the one of the first image.

6. The method of claim 1, further comprising determining a depth to a point on the object based at least in part on the second pattern of light, second image and the predetermined geometrical relationship.

7. The method of claim 1, further comprising determining a depth to a point on the object based at least in part on the determined 3D coordinates.

8. The method of claim 7, further comprising:
determining that the depth is an invalid depth; and
wherein the signal is further based on the determination that the depth is invalid.

9. The method of claim 1, wherein the determining that the change in the pose or shape of the pattern of light includes comparing a change of shape or pose of the pattern of light in the second image with the shape or pose of the pattern of light in the first image.

10. The method of claim 1, wherein:
the at least one camera includes a first camera and a second camera, the first camera having a first camera optical axis and a first camera pose, the second camera having a second camera optical axis and a second camera pose; and
the projector, the first camera and the second camera are coupled in an enclosure in a triangular pattern, the triangular pattern being in a plane not coincident with any projector optical axis, the first camera optical axis and the second camera optical axis, the enclosure being fixed with respect to the frame of reference.

11. The method of claim 7, further comprising:
capturing with the second camera in the first instance a third image of the first pattern of light on the object; and
capturing with the second camera in the second instance the a fourth image of the second pattern of light on the object.

12. The method of claim 1, wherein the change in the pose or shape of the pattern of light is a predetermined change in the pattern position, wherein the pattern of light is offset from at least one epipolar line by a predetermined distance and direction.

13. The method of claim 1, wherein:
first camera includes an optical sensor having a plurality of pixels; and
the ratio of the plurality of points of laser light to the plurality of pixels is less than 0.1.

14. The method of claim 13, wherein the ratio is less than 0.01.

15. The method of claim 12, further comprising determining an uncertainty parameter for the first pattern of light, wherein the change in pattern position is based on the uncertainty parameter.

16. The method of claim 15, wherein the uncertainty parameter is 0.05-0.3 pixels.

17. The method of claim 1, wherein the change in the pose or shape of the pattern of light is a predetermined change in the pattern position where the pattern of light is moved in a direction along at least one epipolar line by a predetermined distance and direction.

18. A system comprising:
an enclosure;
a projector disposed within the enclosure and having an optical axis and projector pose in a frame of reference, the projector being operable to project a pattern of light;
a shape control element operably coupled to the projector, the shape control element being operable to selectively change the pose or shape of the pattern of light based at least in part on a control value;
at least one camera disposed within the enclosure, the at least one camera having a camera optical axis and a camera pose in the frame of reference, the at least one camera is arranged in a predetermined geometrical relationship at least to the projector or to at least one other camera;
a memory having computer readable instructions; and
one or more processors operably coupled to the projector and the at least one camera, the one processors configured for executing the computer readable instructions, the computer readable instructions comprising:
projecting from the projector the pattern of light in a first instance, the pattern of light being projected to a first position, the pattern of light in the first instance being defined by a first control value;
capturing with the at least one camera a first image of the pattern of light on the object in the first instance;
determining based at least in part on the pattern of light in the first image, three-dimensional coordinates of at least one point on at least one of an operator and an object;
changing the pose or shape of the pattern of light in a second instance using the shape control element, the change in the pose or shape being defined by a second control value;
capturing with the at least one camera a second image of the pattern of light in the second instance;
determining with a processor a change in the pose or a shape of the pattern of light between the first image and the second image; and
determining with a processor that the second image is valid based at least in part on the change in the pose or shape being different within a validation threshold, the validation threshold being based in part on a difference between the first control value and the second control value.

19. The method of claim 18, wherein the computer readable instructions further comprise altering at least one of a direction and velocity of the object in response to a probability of an interaction that includes the operator being equal to or above a predetermined probability threshold.

20. The method of claim 18, wherein the computer readable instructions further comprise determining the 3D coordinates a plurality of instances, wherein the determination that the second image is valid is performed in each of the plurality of instances.

21. The method of claim 18, wherein the computer readable instructions further comprise determining the 3D coordinates a plurality of instances, wherein the determination that the second image is valid is performed in once during the plurality of instances.

22. The system of claim 18, wherein the computer readable instructions further comprise transmitting a signal based at least in part on the pose or shape of the pattern of light in the second image not being different from the one of the first image.

23. The system of claim 22, wherein the computer readable instructions further
comprise determining that the depth is an invalid depth; and
wherein the signal is further based on the determination that the depth is invalid.

24. The system of claim 23, wherein the determining that the changed pattern of light i includes comparing a change of shape or pose of the pattern of light in the second image with the shape or pose of the pattern of light in the first image.

25. The system of claim 23, wherein the computer readable instructions further comprise:
capturing with the second camera in the first instance a third image of the first pattern of light on the object; and
capturing with the second camera in the second instance the a fourth image of the second pattern of light on the object.

26. The system of claim 18, wherein the predetermined set of values is an offset from at least one epipolar line by a predetermined distance and direction.

27. The system of claim 24, wherein:
first camera includes an optical sensor having a plurality of pixels; and
a ratio of the plurality of points of laser light to the plurality of pixels is less than 0.1.

28. The system of claim 27, wherein the computer readable instructions further comprise determining an uncertainty parameter of 0.05-0.3 pixels for the plurality of points, wherein the distance is based on the uncertainty parameter.

* * * * *